United States Patent [19]
Chitil et al.

[11] 4,315,772
[45] Feb. 16, 1982

[54] PROCESS FOR STEEL PRODUCTION AND CONVERTER FOR CARRYING OUT THE PROCESS

[75] Inventors: Manfred Chitil, Krefeld-Bockum; Paul G. Mantey, Sulzbach-Rosenberg, both of Fed. Rep. of Germany

[73] Assignee: Klöckner-Werke AG, Duisburg, Fed. Rep. of Germany

[21] Appl. No.: 129,731

[22] Filed: Mar. 12, 1980

[30] Foreign Application Priority Data

Mar. 15, 1979 [DE] Fed. Rep. of Germany ....... 2910103
Nov. 22, 1979 [DE] Fed. Rep. of Germany ....... 2947078
Dec. 11, 1979 [DE] Fed. Rep. of Germany ....... 2949717

[51] Int. Cl.³ .............................................. C21C 5/48
[52] U.S. Cl. ...................................... 75/52; 75/44 S; 75/60; 266/218
[58] Field of Search ............... 75/60, 52, 44 S, 12; 266/218

[56] References Cited
U.S. PATENT DOCUMENTS

| | | | |
|---|---|---|---|
| 3,894,864 | 7/1975 | Langhammer | 75/12 |
| 3,897,243 | 7/1975 | Langhammer | 75/12 |
| 3,948,642 | 4/1976 | Gross | 75/12 |
| 3,982,926 | 9/1976 | Geck | 75/44 S |
| 4,097,028 | 6/1978 | Langhammer | 75/44 S |
| 4,110,108 | 8/1978 | Geck | 75/44 S |

*Primary Examiner*—P. D. Rosenberg
*Attorney, Agent, or Firm*—Watson, Cole, Grindle & Watson

[57] ABSTRACT

A process for the production of steel from a quantity of charge material such as iron scrap, iron sponge, or other essentially metallic iron carriers, makes use of a bottom-blowing converter. Nozzles are provided in the bottom area of the converter and extend into a sump. In order to avoid an uncontrolled flow without the addition of molten pig iron, a molten bath is formed of the charge material by the provision of burners located at the bottom wall area in a lateral wall above the nozzles, finally distributed carbon and oxygen being separately blown in through the nozzles for producing additional melting. The burners may be located either slightly above the level of the molten bath or below such level and in the latter case, the burners are then operated as additional nozzles after their submersion.

16 Claims, 2 Drawing Figures

PROCESS FOR STEEL PRODUCTION AND CONVERTER FOR CARRYING OUT THE PROCESS

BACKGROUND OF THE INVENTION

This invention relates to a process for the production of steel from a quantity of charge material such as iron scrap, iron sponge, or other essentially metallic iron characters, wherein a column of the charge material is inserted in solid form into a converter having a plurality of nozzles disposed in the bottom area thereof, the inserted charge material being rendered molten and overheated upon the combustion of fuel in the presence of oxygen moving in a counter current. The invention further relates to the converter with nozzles disposed in the bottom area thereof for carrying out the process.

A process of the class described herein is described in German Offenlegungsschrift No. 27 19 981 in accordance with which scrap material together with energy carriers containing carbon are charged into a converter having nozzles for the introduction of oxygen which are built into a fire resistant brickwork below the level of the steel bath, whereby a steel melt is produced by means of a controlled introduction of oxygen into the converter. However, in accordance with such approach, it has been shown that an uncontrollable boiling occurs during the overheating as a result of a strong carbon monoxide formation. The boiling may eventually be decreased by carrying out the melting of the scrap more slowly, although this adversely affects the economy of such process. Despite the objectives to avoid the addition of molten pig iron, it became necessary to utilize the aforedescribed process in order to maintain the economy or practicability thereof. Although the batch of pig iron is relatively low as compared to known methods of operation of oxygen converters, the execution of this process will always be associated with a pig iron production plant.

SUMMARY OF THE INVENTION

It is therefore an object of the present invention to provide a process for the production of steel from charge material in the form of scrap or the like such that uncontrollable boiling during the melting will be avoided and the economy of the process will be maintained without the need for adding molten pig iron.

This objective is achieved by the provision of fuel-oxygen burners in a lateral wall at the bottom wall area of the converter, the burners being disposed above the nozzles located in such bottom wall area so that the charge material inserted into the converter is molten with the burners, and with the provision of a sump, finely disbursed carbon and oxygen are fed in separately of one another to the melt via the nozzles.

The sump should be of such a depth that it can readily absorb the carbon and oxygen fed through the nozzles for the production of additional melting heat. The addition of heat is accomplished in the fuel chamber above the melt so that a boiling of the molten bath will be substantially avoided. Additionally, the melting itself may be accomplished by the fuel-oxygen burners which produce hot flames beyond the sump considerably more effectively and quickly than by the burning of the carbon with oxygen which are introduced into the melt. The carbon fed to the melt in a finely disbursed form serves both as a protection against oxydation as well as for melting and thereafter serves for overheating of the melt as well as a reduction agent for the ferrous oxide slag produced during melting.

At the beginning of the overheating, it will be effective to commence the supply of oxygen via the nozzles after reaching a predetermined carbon content in the bath which is adjusted by the supply of the finely distributed carbon. Whenever there is no more scrap in front of the burners which may be molten by the flames produced by the burners, which occurs with or shortly before termination of the melting, the burners may be turned off while the supply of the finely disbursed carbon as well as of the oxygen into the melt is continued until reaching the desired terminal temperature. In carrying out this approach a converter may be used in which its burners are disposed slightly above the level of the bath resulting after melting.

Since the effectiveness of melting by the burners decreases with an increasing preheating temperature of the charge material, it is preferred that the charge material be molten by the burners to the point until the latter lie below the level of the bath, the burners then being operated as nozzles. Thus, during the preheating phase, only a part of the charge material is melted when providing a sump, while the remainder is melted essentially by the development of heat into the bath as a result of blowing in fuel and feeding in oxygen. This will result in an improved use of energy and also a saving of time based on the carborizing and puddling carried out already during melting and as a result of the preheating up to a certain degree, which is particularly effective in counter current by the heat transfer between the gases developed during the combustion of fuel-oxygen adn solid scrap, followed by the subsequently more effective heat development in the bath. Accordingly, the burners may be submerged in the bath because of the rising level of the bath, although they will no longer be operated as burners after submerging. A protective gas, for example, nitrogen, may flow through the burners for producing a stirring effect. The burners, thus operating as nozzles, may be used for additional functions as, for example, the blowing in of oxygen which may possibly include solid substances such as lime, fines, abrasion of iron sponge, etc., or may function as a protective gas bracketting, or for the flowing in of argon and oxygen and/or natural gas, etc. possibly also containing solid substances such as finely disbursed iron carriers, coal slag, lime, etc. Moreover, the burners may be disposed either parallel to the nozzles or at angle thereto.

The preheating for the formation of the sump by the burners and the further melting by the supply of carbon and oxygen to the bath, possibly during an additional operation of the burners, is carried out for example to the point until about one-half the charge material has liquefied so that a bath level will result which reaches up to the burners. After submersion into the bath, the burners will be operated as nozzles, especially as Q-BOP nozzles.

Oil or finely disbursed carbon and especially natural gas, for example, are suitable as fuels for the fuel-oxygen burners.

For achieving a continuous supply of finely disbursed carbon as well as of oxygen, it will be effective if a melted charge is emptied from the converter leaving only a residue of steel and if at the same time and with the beginning of a sueceeding charge, finely disbursed carbon and oxygen are fed in through the nozzles.

The oxygen fed in through the nozzles, disposed in the bottom area of the converter (and through the burners operating as nozzles and which may open above the nozzles), may be encased in a known manner by a gaseous hydrocarbon which may also serve as a carrier gas for these solid carbons. Moreover, separate nozzles may be arranged for the supply of the finely disbursed carbon.

The fuel-oxygen burners are preferably disposed to one side of the tipping axis of the converter so that, when emptying the converter, the burners will not come in contact with the bath. Otherwise, the burners may be disposed on opposite sides of the tipping axis and provision may be made for blowing a protective gas through the burners during the emptying of the converter.

The height/diameter ratio of the present converter is at least 3:2 in order that any good shaft effect may be achieved during the melting by fuel-hydrogen burners. It may be therefore necessary to charge the material for one converter charge several times.

The blast furnace gas which develops in the bath during the melting and during the turnover may be secondarily burnt in the upper portion of the converter by the supply of oxygen or entering air, since there develops a combustable exhaust gas from the beginning to the end of the melting. Another use of the exhaust gas outside the converter is also possible, whereby the heating value of the blast furnace gas may possibly be controlled by after-burning.

It should be noted that solid carbon may be added with the charge material and, for certain purposes, for example, for producing analyses with little trace elements, it may be effective to add solid or possibly molten pig iron to the charge material.

The present process is particularly effective with regard to the power balance; however, burners disposed in a lateral wall of the converter at the bottom may create problems with regard to their durability under certain circumstances. Therefore, in order to make the higher lying burners, also operable as nozzles, more easily accessible and thus more easily servicable, provision is made for the bottom of the converter to have a deeper area into which the nozzles extend as compared to an adjacent higher lying area into which the burners, operable as nozzles, extend. This higher lying area may surround the lower lying area concentrically or the two areas may be disposed symmetrically, and the higher lying area may have an upper surface sloping downwardly toward the lower area, with the lower lying area formed as a trough for forming a sump so that a portion of the melt will remain therein during the emptying of the converter. The sump has such a depth that the carbon and oxygen blown in through the nozzles is absorbed by the sump, whereby during a subsequent charge, the supply of finely disbursed carbon and oxygen through the nozzles in the lower area is utilized for the production of melting heat in addition to the heat produced by the burners.

DETAILED DESCRIPTION OF THE INVENTION

Figure 1:
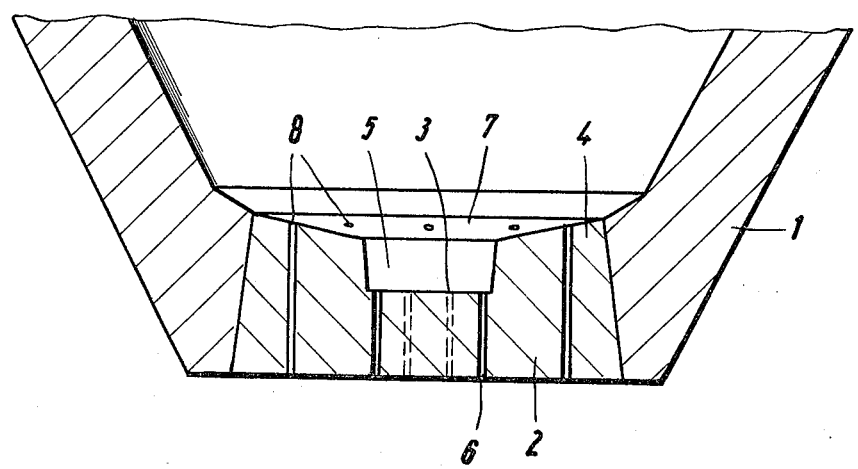
FIG. 1 is a vertical section schematically showing a part of a converter constructed in accordance with the invention which includes an insert at the bottom containing nozzles, burners and a sump.

Turning now to the drawings wherein like reference characters refer to like and corresponding parts throughout the several views, converter 1 is typically bricked up with a fire-resistant material and has an insert 2 at its bottom, the insert having a central area 3 lying deeper than an adjacent higher lying area 4 annularly and concentrically surrounding the central area. A trough 5 is defined between the deeper lying and higher lying areas which opens into a lateral wall 7 which slightly slopes downwardly toward the trough.

Extending into the deeper lying area 3 are nozzles 6 through which oxygen for puddling or through which solid carbon in finely distributed form may be blown into a melt located in the converter. Nozzles 6 provided for blowing in oxygen are formed in a known manner at least as double-walled pipes so that the jet of oxygen may be surrounded by a protective medium containing hydrocarbon. Also, the jet of oxygen may contain solid substances such as finely dispensed lime, etc.

Burners 8 may also be formed as double-walled pipes which terminate in wall 7 of higher lying area 4 so that quantities of fuel, for example, heating oil or natural gas, may be introduced through the annular space formed by the double pipes and a quantity of oxygen necessary for the combustion may be introduced through the inner pipe.

For the production of a steel melt from solid iron carriers, especially scrap, but also iron sponge or the like, essentially metallic iron carriers, the charge is inserted into the converter and is rendered molten from below by the fuel-oxygen burners 8, whereby the exhaust gases formed during the melting, preheat the charge material located above the molten bath. In such manner, a sump is formed first in trough 5 which is carborized first by finely disbursed carbon fed thereto through nozzles 6 into lower area 3 after which the supply of oxygen commences through nozzles 6 in lower area 3 for burning the finely disbursed carbon in the sump for thereby producing additional melting heat. The oxygen may be fed in through nozzles 6 other than those nozzles 6 used for feeding in the carbon. The exhaust gases formed by this combustion likewise preheat the still solid charge material and may possibly be burnt secondarily. Burners 8 in the case of continuous melting will submerge into the molten bath, and a protective gas may flow through them when they are operated as nozzles or when assuming additional functions, especially the blowing in of oxygen which may include solid substances (lime, fines, abrasion of iron sponge, etc.) and encased with protective gas, for the blowing in of argon and/or nitrogen and/or natural gas, etc., which may also contain solid substances such as finely disbursed iron carriers, fine slag coal, lime, etc.

Rather than lying axially as shown, burners 8 may be oriented at a spatial angle to the axial direction for the corresponding alignment of the flames formed thereby as well as for the production of a stirring effect after submersion.

Insert 2 at the bottom is formed as a truncated wall for engagement with the converter with the joints therebetween being sealed by fire-resistant material.

It can be seen that burners 8 terminate at an elevation higher than nozzles 6, and are as easily accessible as nozzles 6 since they are likewise disposed in insert 2.

Higher lying area 4 may also continuously merge with lower lying area 3. And, the latter may extend in a radial direction up to the converter with which the insert is jointed, or higher lying area 4 may be formed of two sections of a segment of a circle disposed adjacent and on both sides of the lower lying area.

Figure 2:
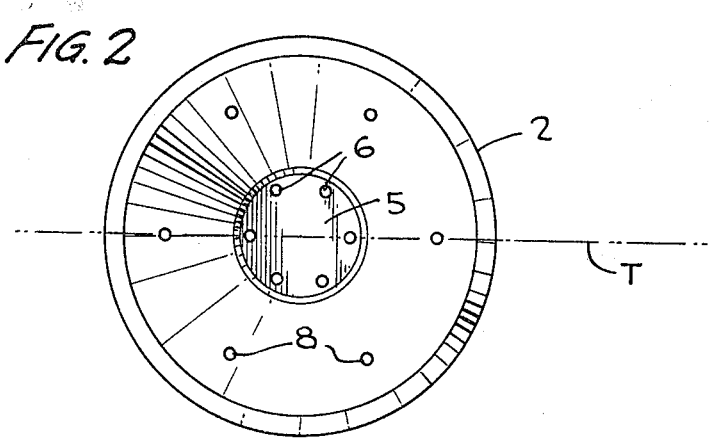
FIG. 2 is a top plan view of the insert located at the bottom of the converter.

FIG. 2 illustrates the tipping axis T of the converter relative to insert 2. Nozzles 8 may be disposed, when viewed in plan, so as to lie relative to the tipping axis to one side thereof, so that during emptying the converter by tipping it about axis T in the direction away from the burners, the burners avoid coming into contact with the molten bath. Otherwise, the burners may be disposed on both sides of axis T, and a protective gas may be provided for blowing out of the burners during the emptying of the converter to thereby avoid any clogging.

Obviously, many modifications and variations of the present invention are made possible in the light of the above teachings. It is therefore to be understood that within the scope of the appended claims, the invention may be practiced otherwise than as specifically described.

What is claimed is:

1. A two-step process for the production of steel using a converter and a quantity of charge material such as iron scrap, iron sponge, or other essentially iron carriers, wherein a column of the charge material is inserted in solid form into the converter having a plurality of nozzles lying in the bottom area thereof at upper and lower levels, a sump being formed in said bottom area into which said lower level nozzles extend, first step of the process comprising forming a molten bath at said bottom area by least partly melting the charge material by the combustion of fuel in the presence of oxygen moving in a counter current with the use of said higher level nozzles and which are operated as fuel-oxygen burners, the level of said molten bath lying above said lower level nozzles, the second step of the process comprising feeding finely distributed carbon and oxygen into said molten bath within said sump respectively through at least one and through at least another of said lower level nozzles, whereby the residue quantity of the charge material is melted and thereby the entire molten charge is overheated.

2. The process according to claim 1, wherein said first step includes the step of forming said sump with the use of said higher level nozzles operating as said fuel-oxygen burners, melting the charge material with the use of said burners until said burners lie below the level of said molten bath so formed, and thereafter using said higher level nozzles for feeding oxygen and a selected gas into said molten bath.

3. The process according to claim 2, wherein the selected gas comprises argon containing a protective gas.

4. The process according to claim 2, wherein said higher level nozzles comprise Q-BOP nozzles through which said selected gas, which contains selected solid substances, is fed into said molten bath.

5. The process according to claim 1, wherein said higher level nozzles lie slightly above the bath level resulting after the melt.

6. The process according to claim 1, 2, 3, 4 or 5, wherein the oxygen is fed through said at least one lower level nozzle after reaching a predetermined content of carbon fed through said at least another lower level nozzle.

7. The process according to claim 6, further including the step of emptying said converter while retaining the residue quantity, inserting new charge material into the converter, and repeating said first and second steps.

8. The process according to claim 7, wherein lumpy carbon carriers are added to the charge material.

9. A converter for the production of steel from charge material such as iron scrap, iron sponge, or other essentially metallic iron carriers, wherein a column of the charge material is inserted in solid form into the converter provided with a plurality of nozzles lying at a bottom thereof at upper and lower levels, a sump formed in said bottom into which said lower level nozzles extend, a molten bath being formed to at least partly melt the inserted charge material upon the combustion of fuel in the presence of oxygen moving in a counter current with the use of said higher level nozzles being operated as fuel-oxygen burners located at said bottom in a lateral wall above said lower level nozzles, and said lower level nozzles being provided for separately feeding finely dispersed carbon and oxygen into said bath, whereby the residue quantity of the charge material is melted and thereby the entire molten charge is overheated.

10. The converter according to claim 9, wherein said burners are located above the level of the molten bath resulting during the sump formation into which substantially no oxygen is fed via said lower level nozzles.

11. The converter according to claim 9, wherein the converter is tiltable in one direction about a horizontal axis during emptying, said burners lying on one side of said axis so as to avoid contact with the molten bath during the emptying.

12. The converter according to claim 9, wherein said burners are located slightly above the level of the molten bath resulting after the melt.

13. The converter according to claim 9, wherein said bottom has an area which lies deeper as compared to an adjoining higher lying area, said nozzles extending into said deeper area, and said burners, which may be operated as nozzles, extending into the top of said higher lying area.

14. The converter according to claim 13, wherein said higher lying area surrounds said lower lying area and is coaxial therewith.

15. The converter according to claim 14, wherein said top of said higher lying area slopes downwardly toward said lower lying area.

16. The converter according to claim 15, wherein said lower lying area is formed by a trough forming said sump and is sufficiently deep that the carbon and oxygen fed thereto through said nozzles are capable of being absorbed by the walls of said sump.

* * * * *